(12) United States Patent
Knutson et al.

(10) Patent No.: US 6,434,365 B1
(45) Date of Patent: Aug. 13, 2002

(54) PROVIDING INITIAL POWER ESTIMATE TO WIRELESS TELEPHONE HANDSETS

(75) Inventors: Paul Gothard Knutson, Marion; Kumar Ramaswamy, Indianapolis; Dong-Chang Shiue, Carmel, all of IN (US)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/222,506

(22) Filed: Dec. 29, 1998

(51) Int. Cl.[7] .............................. H04B 1/00; H04B 7/00
(52) U.S. Cl. .......................................... 455/69; 455/522
(58) Field of Search ............................ 455/69, 70, 522, 455/226.1, 422, 509

(56) References Cited

U.S. PATENT DOCUMENTS

| | | | | |
|---|---|---|---|---|
| 4,870,698 A | * | 9/1989 | Katsuyama et al. | 455/67.1 |
| 5,278,992 A | * | 1/1994 | Su et al. | 455/69 |
| 5,564,075 A | * | 10/1996 | Gourgue | 455/69 |
| 5,564,080 A | * | 10/1996 | Eul et al. | 455/69 |
| 5,566,165 A | * | 10/1996 | Sawahashi et al. | 370/342 |
| 5,604,730 A | * | 2/1997 | Tiedemann, Jr. | 370/252 |
| 5,710,981 A | * | 1/1998 | Kim et al. | 455/69 |
| 5,722,051 A | * | 2/1998 | Agrawal et al. | 455/69 |
| 5,768,684 A | * | 6/1998 | Grubb et al. | 455/13.4 |
| 5,806,003 A | * | 9/1998 | Kolma et al. | 455/522 |

* cited by examiner

Primary Examiner—Doris H. To
Assistant Examiner—Charles N. Appiah
(74) Attorney, Agent, or Firm—Joseph S. Triopli; Harvey D. Fried; Joseph J. Kolodka

(57) ABSTRACT

A wireless telephone system having a plurality of wireless, battery-powered handsets and a base unit, the base unit having a base transceiver. Each handset has a handset transceiver for establishing a wireless link over a shared channel with the base unit via the base transceiver, wherein the base transceiver transmits to a given handset transceiver a forward data message, which contains forward power level information identifying a forward power level at which the forward data message was transmitted by the base transceiver. The receiver receives and locks onto the forward data message. The transmitter transmits to the base transceiver a return data message at a return power level determined in accordance with the forward power level information.

11 Claims, 3 Drawing Sheets

PROVIDING INITIAL POWER ESTIMATE TO WIRELESS TELEPHONE HANDSETS

FIELD OF THE INVENTION

The present invention relates to multi-line wireless telephone systems and, in particular, to techniques for conserving power in battery-operated wireless handsets in wireless telephone systems.

BACKGROUND OF THE INVENTION

The use of telephones and telephone systems, including wireless telephone systems, is widespread. In wireless telephone systems, a cordless or wireless telephone handset unit communicates via either analog or digital radio signals with a base unit, which is typically connected via a standard telephone line to an external telephone network. In this manner, a user may employ the wireless handset to engage in a telephone call with another user through the base unit and the telephone network.

Multi-line wireless telephone systems are also in use in various situations, such as businesses with many telephone users. Such systems employ a handset that communicates with up to N handsets simultaneously, typically with digital communications schemes, such as a spread-spectrum, time division multiple access (TDMA). In a TDMA system, a single RF channel is used, and each handset transmits and receives data during a dedicated time slice or slot within an overall cycle or epoch. During other time slots of the epoch, the handset is in an "off" state to conserve power.

In such systems, the handsets are typically battery-powered. Efficient power use is therefore important for a wireless system, in part to conserve handset battery power. In addition, too much power used to transmit signals from a handset can cause communication problems such as saturation of the receivers.

Thus, various techniques are typically employed to conserve power in wireless handsets, such as handsets of a digital wireless telephone system. For example, in one technique, the handset is put in a sleep mode where all but a watchdog function are powered down. However, in such a system, the handset may be moved from the position when it last communicated with the base unit. This can cause the handset to utilize too much power when communication needs to be reestablished. This excessive initial power use can saturate the base unit receiver, delay synchronization, and drain unnecessary power from the handset battery.

SUMMARY

A wireless telephone system having a plurality of wireless, battery-powered handsets and a base unit, the base unit having a base transceiver. Each handset has a handset transceiver for establishing a wireless link over a shared channel with the base unit via the base transceiver, wherein the base transceiver transmits to a given handset transceiver a forward data message, which contains forward power level information identifying a forward power level at which the forward data message was transmitted by the base transceiver. The receiver receives and locks onto the forward data message. The transmitter transmits to the base transceiver a return data message at a return power level determined in accordance with the forward power level information.

DESCRIPTION OF THE PREFERRED EMBODIMENT

Figure 1:
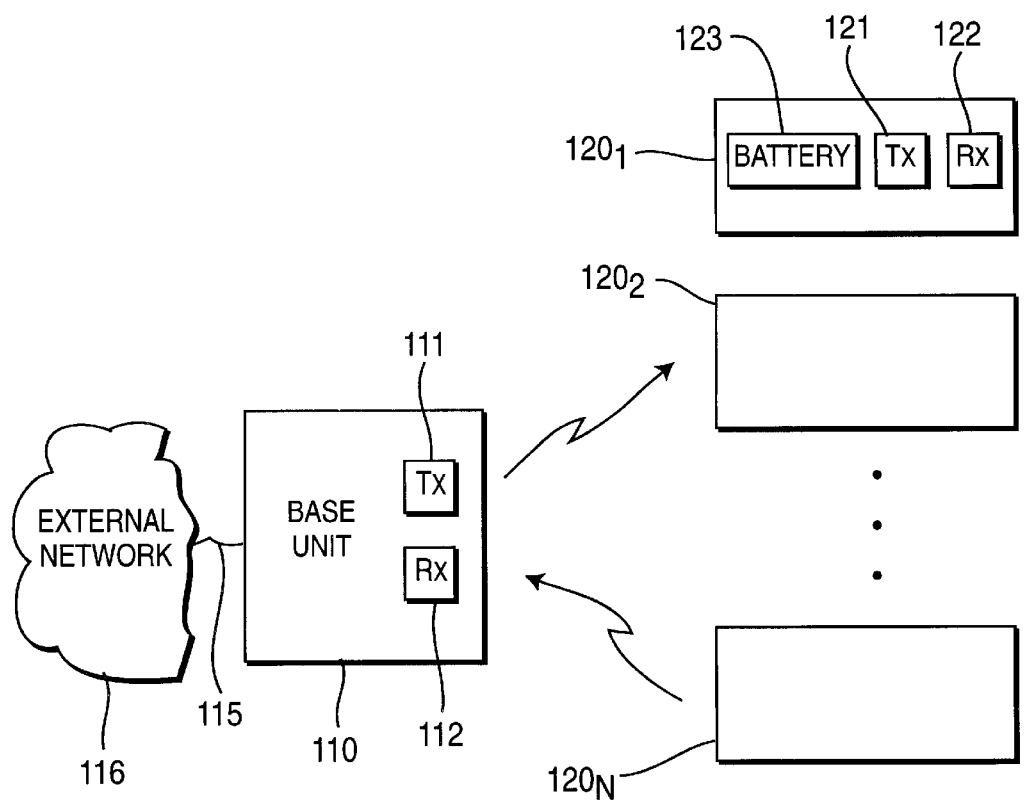
FIG. 1 is a block diagram of TDMA multi-line wireless telephone system, in accordance with an embodiment of the present invention.

Referring now to FIG. 1, there is shown a block diagram of TDMA multi-line wireless telephone system 100, in accordance with an embodiment of the present invention. TDMA system 100 comprises a base unit 110, which has receiver and transmitter units 112 and 111, respectively, and is coupled to external telephone network 116 via telephone line(s) 115. System 100 also comprises N wireless handsets $120_1, 120_2, \ldots 120_N$. Each has a transmitter and receiver unit (transceiver), such as transmitter 121 and receiver 122, and battery, such as battery 123, of handset $120_1$. At any given time, some number (or none) of the handsets are operating or off-hook (i.e., in the process of conducting a telephone call). System 100 thus provides a wireless network between the base station 110 and each handset $120_i$ ($1 \leq i \leq N$). In one embodiment, system 100 comprises 4 handsets $120_1$, to $120_4$ all of which may be active simultaneously. In another embodiment, system 100 comprises a different number of handsets, e.g., N=12, of which, for example, up to 8 can be active at a time.

As used herein, a handset is "active" when a link has been established with the base unit. An active handset may either be off-hook (conducting a telephone call) or on-hook (not conducting a telephone call but still active). An inactive handset cannot receive calls or data from the base unit until it is powered on and locks onto and synchronizes with the base unit. A handset becomes inactive whenever the link is lost for a variety of reasons. For example, a link may be lost due to the distance between base and handset becoming too great, or an obstruction coming there between; or because of a loss of AC power at the base unit, or because of a dead or removed handset battery. In addition, besides the normal "on/off" button of a handset which switches to off hook/on hook, a master power switch can switch all power off to the handset causing the link to be broken and thus the handset to be inactive for purposes of TDMA communications with the base unit. An inactive handset must establish (or re-establish) a link with the base unit before communications may be resumed. This requires a forward channel or downlink to be locked onto from the base unit, typically during the dedicated TDMA epoch data slot for the particular handset, and for a return channel link or uplink to be sent back from the handset to the base unit and locked onto by the base unit. A signal or data message transmitted from the base unit to a handset may be referred to as a forward signal, and a signal or data message transmitted from a handset to the base unit may be referred to as a return signal.

As explained above, efficient power use is important for a wireless telephone system since the handsets are typically battery-powered. In one embodiment, therefore, the present invention comprises a TDMA system and protocol for connecting multiple transceivers to a base station over a single channel. In particular, system 100 employs a digital TDMA scheme, as described in further detail below, which allows power to be efficiently used since each operating handset is "off" except for a watchdog function (i.e., not transmitting or receiving data, and thus not using as much battery power from a handset battery such as battery 123)

during most portions of the TDMA epoch, and is only "on" during its own allocated time slices or slots, as described in further detail below. In one embodiment, a handset powers off by switching off power to at least its CPU and transceiver (receiver and transmitter) units, while leaving powered on for only a clock and associated timer or watchdog circuitry sufficient to wake up the CPU at a predetermined slot time.

However, use of a time-division multiplexing (TDM) technique such as TDMA, and switching each transceiver (handset) on only during its own time slots can give rise to various problems. For example, because handsets use an RF energy detector to sense when a signal is being transmitted from base station 110 to one of the handsets, communication intended for one handset may activate other handsets, causing unnecessary battery 123 draining in those other handsets. In the present invention, therefore, the handsets are carefully synchronized so that each handset only "listens" for transmissions in its own time slots.

Figure 2:
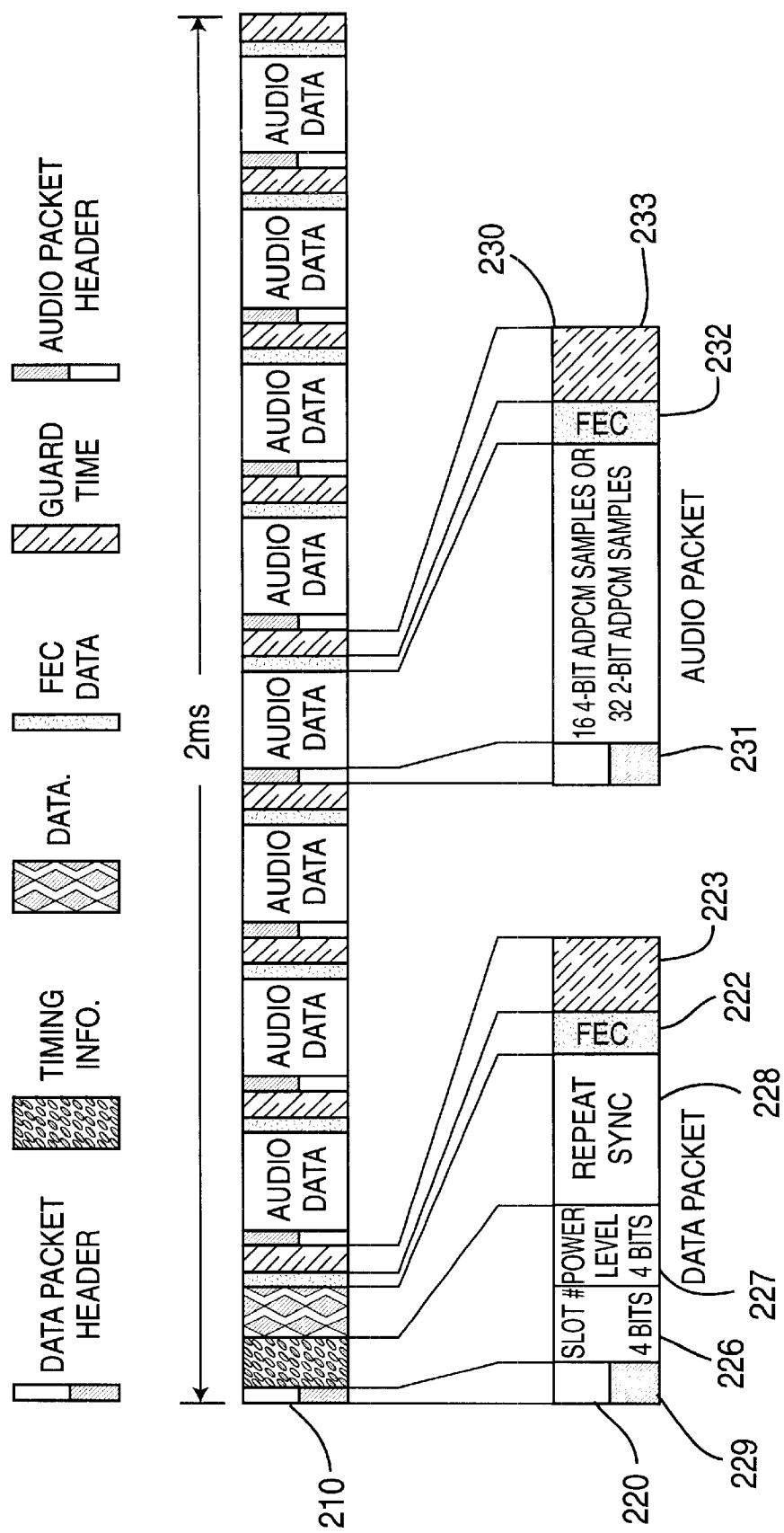
FIG. 2 is a schematic representation of the field, data packet, and audio packet structures used in the TDMA scheme of the system of FIG. 1.

Referring now to FIG. 2, there is shown a schematic representation 200 of the field of a TDMA scheme of TDMA system 100 of FIG. 1. Field 210 is one field of a TDMA scheme, and comprises data packet structure 220 and audio packet structure 230. In one embodiment, a 2 ms field 210 of digital data comprises nine total packets, viz. a data packet 220 and eight audio packets such as audio packet 230. Each data packet is a set of data transmitted either to a given handset from the base unit or vice-versa, during a discrete time slice during which time no other handsets receive or transmit data over the systems data channel. Each audio packet is a set of audio data transmitted either to a given handset $120_i$ from the base unit 110 or vice-versa, during a given time-slice in an overall "epoch" scheme, again during which time no other handsets receive or transmit data over the system's data channel. The data packet 220 illustrated in FIG. 2 also functions as a synchronization data message (also called a "signature packet"), the function of which is described in further detail below.

It will be appreciated that both "off" and "on" states are parts of the cycle of an active handset, i.e. a handset for which a link has already been established. An off-hook, active handset conserves power use by turning "on" for only parts of the TDMA epoch. Thus, an off-hook, active handset powers on at predetermined data and audio time slots during each TDMA epoch to receive and transmit both audio and data. An on-hook (or sleep mode), active handset conserves even more power by entering a "sleep" mode in which the handset is off for even more of the TDMA epoch. In sleep mode, the handset comes on only periodically, e.g. once every TDMA epoch or once every several TDMA epochs, during its allocated receive data slot, to "sniff" for incoming data, such as an incoming phone call for which the handset should come "off hook" to receive the call, or incoming caller ID information to display locally for the user. In either active mode, off-hook or on-hook (sleep mode), the handset is not powered on for the entire TDMA cycle, but only for a part thereof, to conserve power; however, even more power is saved when the handset is on-hook (i.e., in sleep mode), since the handset need not come on during any audio packet slots or even during the data packet slots for every epoch.

As illustrated, each type of packet contains various subfields or sections. For example, data packet 220 comprises packet sync bytes field 229, 4-bit slot number field 226, 4-bit power level field 227, repeat sync field 228, FEC (forward error correction) field 222, and guard time field 223. The data in data packet 220 is used to communicate between the base unit and a particular handset, and contains various types of information, such as caller ID type information, range and power information, and the like, as described further below.

Audio packet 230 comprises an audio packet header 231, FEC data section 232, and guard time 233. Audio packet header 231, for example, contains information identifying the audio packet (such as the handset), the current place in the epoch, and the like.

In one mode of operation, each active, off-hook handset receives 16 4-bit ADPCM (adaptive differential pulse code modulation) samples during each time slice of the epoch allocated for the handset to receive audio data; and transmits to the base unit 16 ADPCM samples during each time slice of the epoch allocated for the handset to transmit audio data. In another mode of operation, the number of samples may be doubled to 32 per time slice, by lowering each sample's quality to 2-bit samples. ADPCM and related technical issues are described in detail in International Telecommunication Union (ITU), Recommendation G.727, (12/1990), A5-, 4-, 3- and 2-Bits Sample Embedded Adaptive Differential Pulse Code Modulation (ADPCM),@ http://www.itu.ch. In sleep mode, an active handset does not come on to receive or transmit audio packets.

Audio packet 230 therefore also comprises a main 64-bit "audio data" portion, which comprises either 16 4-bit ADPCM samples (high quality), or 32 2-bit ADPCM samples (low quality). As will be appreciated, for a 2 ms field, high quality (16 4-bit ADPCM samples per audio packet or time slice) provides 32 Kbps ADPCM (the default audio data), and low quality (32 2-bit samples shared between two handsets, per audio packet) provides 16 Kbps.

In the present invention, as described in further detail below, the synchronization data messages comprise power level information that may be used by an inactive handset to establish or reestablish a link, or by an inactive handset to continually maintain the appropriate return channel power levels.

TDMA scheme 200 is employed by a given handset $120_i$ once it has already established a link with base unit 110, i.e. once it is active. However, because each handset is independently movable and may be in a different physical position with respect to base unit 110, different parameters are needed by the base unit 110 and the handset to synchronize with one another to establish a link. One parameter that must be established by handset $120_i$, is the appropriate power level at which to transmit on the return channel link or uplink.

Without the present invention, during establishing (or re-establishing) of a link, handset $120_i$ receives a signal, or downlink, from base unit 110 that it can synchronize onto. This downlink of a synchronization data message such as data packet 220 is received during the appropriate data slot of the TDMA epoch allocated for the particular handset. When handset $120_i$ responds with an RF signal to complete the link (the return channel link, or uplink), however, it must do so at the appropriate power level before the link can be established. Without the present invention, handset $120_i$ would have to try various parameter combinations of which there may be several thousand or more, including various carrier offsets, power levels, and other parameters, and permutations thereof. The power level for transmission from either base unit 110 or a handset $120_i$ can vary, for example, from 1 mW to 1 W. This process can cause up to seconds of delay in establishing the link, can saturate base unit 110 when too much power is transmitted by handset $120_i$ during the return channel link, which results in the digital spectrum of the incoming signal being destroyed. This also wastes handset battery 123 power when too high power levels are used.

The present invention utilizes independent automatic gain control (AGC) to help with tracking or locking with changes in signal intensity due to the dynamic range of the signal. However, AGC typically cannot track over systems with very large dynamic range, such as the present system 100, which may have, for example, 100 dB of dynamic range. As described in further detail below, the present invention allows a much larger dynamic range to be tracked and handled in a system than is possible by using AGC alone.

Figure 3:
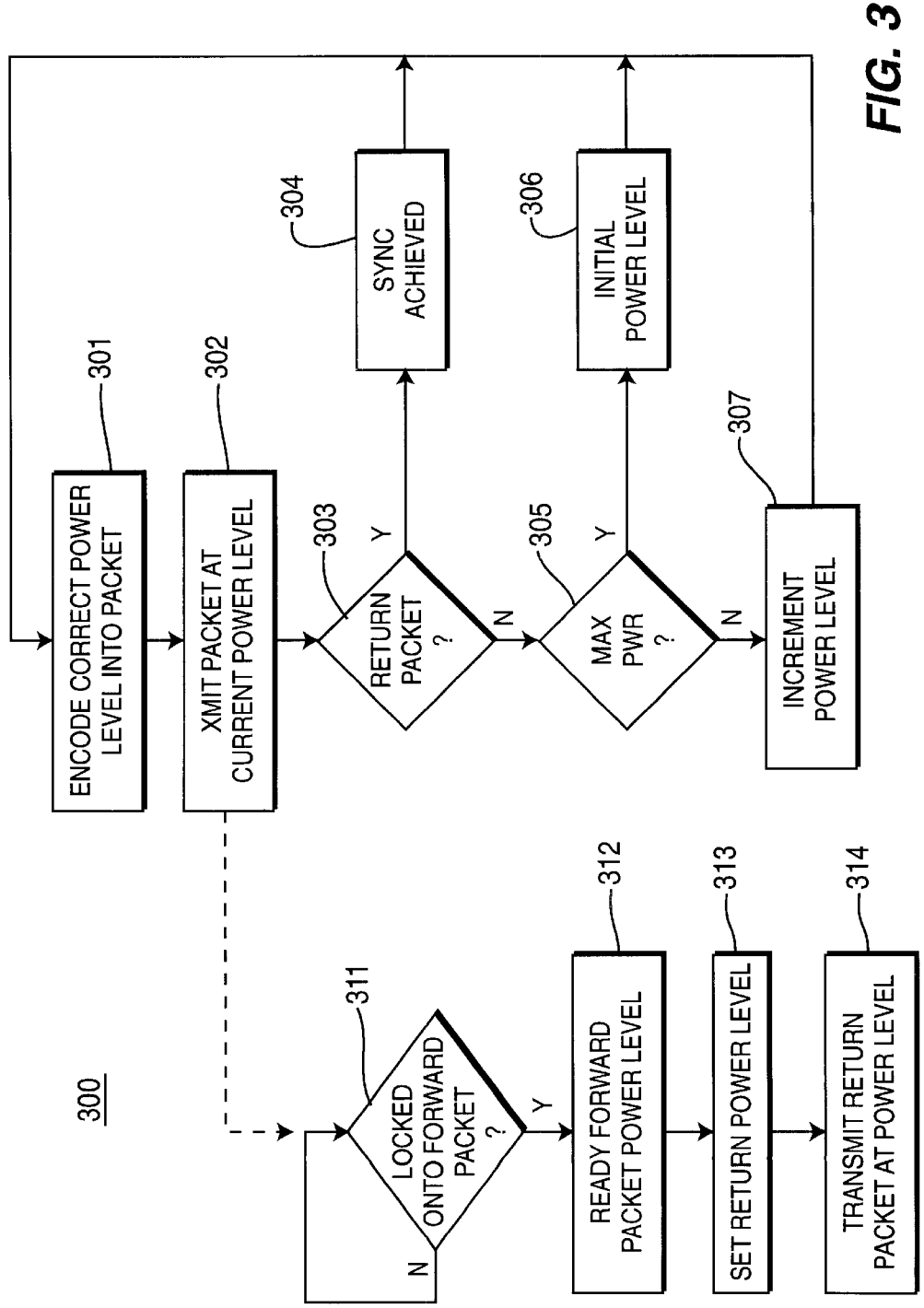
FIG. 3 is a flow diagram illustrating the method of operation of the system of FIG. 1, in accordance with an embodiment of the present invention.

In the present invention, base unit 110 includes in the synchronization data messages power level information. This may be detected by an inactive handset and used to establish a link, or by an active one and used thereby to maintain the appropriate power level. Referring now to FIG. 3, there is shown a flow diagram illustrating the method of operation 300 of system 100 of FIG. 1, in accordance with an embodiment of the present invention.

When handset $120_i$ is inactive, base unit 110 periodically transmits, during the appropriate TDMA epoch data slot for the particular handset, synchronization data messages at successively higher power levels, to attempt to downlink. In one embodiment, when handset $120_i$ is inactive, base unit 110 transmits a synchronization data message such as data packet 220, once per TDMA epoch, where each successive data packet 220 is transmitted at successively higher power levels, until the maximum is reached, after which the cycle repeats, starting at the lowest power level. In an alternative embodiment, when handset $120_i$ is inactive, base unit 110 transmits a synchronization data message 220 once every several TDMA epochs, e.g. every 4th TDMA epoch.

In one embodiment, during this cycle base unit 110 successively steps up output power in 20 dB steps until a link is established, or until the cycle is repeated after the maximum output power is used without a link being established (handset $120_i$, may be out of range or out of battery power, for example). Base unit 110 includes in the synchronization data messages information about the transmission power level of the current synchronization data message. Thus, until synchronization is achieved, base unit 110 encodes the current power level into the next synchronization data message (forward packet or forward data message) and then transmits it at the current power level (steps 301, 302). When a return packet is finally received synchronization has been achieved (steps 303, 304), but if not, then base unit 110 checks to see if the current power level is at a maximum (step 305). If so, the power level is initialized to the lowest level and the cycle repeated until a return packet is finally received (step 306). If not, the power level is incremented to the next higher power level and the cycle repeated until a return packet is finally received (step 306).

When handset $120_i$ is attempting to link and thus become active, it will eventually lock on to one of the downlink synchronization data messages having the appropriate power level (step 311). From this message, handset $120_i$ can determine from the 4 bits of power level field 227 at which power level the message was transmitted by base unit 110 (step 312). Handset $120_i$ then uses this embedded power level information to appropriately set its own power level for the return channel link or uplink, and then transmits the return packet at the power level set in accordance with the current forward packet power level read from the successfully locked-onto forward packet (steps 313, 314). This prevents saturating the base with too much RF power and also conserves the handset $120_i$ battery.

Once an initial link is established where the return channel link used the embedded power level information in the downlink, fine tuned ranging can subsequently be accomplished by both the base and the handset exchanging AGC level information and establishing the optimal power levels to use in order to maintain robust links.

Thus, in the present invention, TDMA scheme 200 is used to transmit data packet 220 as a synchronization data message whenever a particular handset is inactive. When a particular handset $120_i$ is inactive (a link is not currently established), base 110 periodically transmits a synchronization data message 220, containing the following information:

1. Two data packet sync bytes (packet sync bytes field 229);
2. 4-bit word with slot information (slot number field 226);
3. 4-bit word indicating power level being transmitted (power level field 227); and
4. Redundant sync information bytes, to aid locking handset $120_i$ on startup (repeat sync field 228).

The present invention utilizes independent AGC, carrier tracking loops (CTL), and equalizer loops for each link, to independently track demodulation parameters and states associated with these three loops or blocks. The states and parameters associated with these three loops and which are adjusted to improve or allow synchronization are referred to herein, in general, as demodulation parameters. Since each handset is independently moving and is in a potentially unique position, different parameters are needed by the base unit 110 to synchronize with each handset at the beginning of the time slice for that handset, including the appropriate power level. Thus, the power level information included in the synchronization data messages may also be used by an already-active handset to continually update its own power level and to maintain the link.

Accordingly, when handset $120_i$ is active but in sleep mode, handset $120_i$ periodically "sniffs" the channel, i.e. locks onto a transmitted synchronization data message 220, and tunes its timing synchronization and stores the base transmitted power at which it successfully managed to lock to the system. This sniffing may be done once every epoch during the TDMA epoch data slot allocated to that particular handset, or some epochs may be skipped and only every several epochs sniffed. As described above with reference to an inactive handset, when a handset is in sleep mode (i.e., active but on-hook), base unit 110 transmits a synchronization data message 220 either once per TDMA epoch or once every several TDMA epochs. Because link has already been established and the appropriate power levels are thus known for both downlink and return channel link, no changes in power level of either side of the link need to occur unless there is some change to the communication channel. If, for example, during the sleep mode, handset $120_i$ moves farther away from base unit 110, handset $120_i$ can recognize from the received signal getting too weak (i.e., starting to drop below the SNR threshold) that the power level of its own transmissions needs to be increased. Because it knows, from the embedded power level information, the power level of the too-weak signal received from base unit 110, it can use this power level information to determine how much to increase its own power level by. Handset $120_i$, can also notify base unit 110 that it needs to increase its power level. Similar adjustments can be made if the power level becomes too high and saturation begins to occur.

If the power of the base 110 becomes too low so that the link is lost because the signal drops below the SNR threshold, or if the power rises too high thereby causing the link to be lost due to saturation of either receiver 122 or 112, handset $120_i$ loses lock and the initialization process described above begins. Thus, if lock is lost then handset $120_i$ waits for a different power level signal from base unit 110. Base unit 110 eventually realizes lock has been lost when it does not receive the expected acknowledgment messages from handset $120_i$, and begins to cycle through a sequence of power levels as described above. In one embodiment, instead of starting anew from the lowest power level, if lock is lost then base unit 110 starts from the last used power level and begins to step up in every successive synchronization data message 220, until the maximum power is reached, at which time the cycle begins again at the lowest power level.

The present invention provides a number of advantages. First, it provides for comparatively fast link establishment or re-establishment, since the correct power level for the return channel link is known before it is initiated. Second, handset battery power is conserved because, in most instances, the handset will initiate the return channel link at a reasonable power level where a link is possible to establish.

As an example, suppose there are 10 power levels for both handset $120_i$ and base unit 110 to use, where power level 1 is the weakest and power level 10 is the maximum power level. The appropriate power level is primarily a function of the distance between base unit 110 and handset $120_i$, although other factors affect the appropriate power level. In this example, suppose that handset $120_1$ is located approximately 50 feet away from base unit 110, and needs to re-establish a link with base unit 10. This may be the case, for example, when handset $120_1$ is activated or powered up after having lost all power. At the TDMA time slot allocated to handset $120_1$, base unit 110 transmits successive synchronization data messages at increasingly higher power levels. Base unit 110 will transmit up to 10 such messages at each of the 10 power levels, until an appropriate message is received back from handset $120_1$. Assume that power level is sufficient and thus the appropriate power level given the distance and path between handset $120_1$ and base unit 110. In many contexts, it can be assumed that the power level appropriate for the downlink is the same as that appropriate for the return channel link. Thus, when base unit 110 transmits the fifth synchronization data message, handset $120_1$ will lock onto this data message, and will also determine from the embedded power level information that power level 5 was the appropriate power level to use. In sending back an acknowledgment message to complete the link, handset $120_1$ will respond at power level 5, which will likely be the appropriate power level.

In alternative embodiments, there may be many more than 10 power levels, and the maximum power levels of and number of power levels available to base unit 110 and handset $120_1$ need not be the same. In general, therefore, handset $120_1$ sets its own initial power level based on the power level information embedded in the message it locks onto which is transmitted by base unit 110. For example, it may be desirable to use twice as much power, on average for base-to-handset transmissions as vice-versa. In this case, if a power level 8 is used by base unit 110 then handset $120_1$ may, for example, use power level 4 (assuming linear power level steps).

In addition to digital communications of a wireless telephone system as described hereinabove, the present invention is also applicable to BPSK, QPSK, CAP and QAM, for example, as well as to VSB modulation systems such as employed by the Grand Alliance High Definition Television (HDTV) system proposed for use in the United States. One skilled in the art will recognize what design changes are required to adapt the disclosed transmitter modulation system to the desired modulation scheme, and will understand how to design the illustrated components to operate with the desired modulation scheme.

One skilled in the art will recognize that the wireless system described above according to the principles of the invention may be a cellular system where base unit 110 represents a base station serving one of the cells in a cellular telephone network.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A transceiver for communicating with a second transceiver, the transceiver comprising:

a receiver for receiving and locking onto a forward data message transmitted by the second transceiver, wherein the forward data message comprises forward power level information identifying a forward power level at which the forward data message was transmitted by the second transceiver and a downlink data packet transmitted by the second transceiver before a communications link is established; and the return data message comprises a return channel link is established; and the return data message comprises a return channel link data packet transmitted by the transceiver after the transceiver locks onto the forward signal;

a transmitter for transmitting to the second transceiver a return data message at a return power level determined in accordance with the forward power level information; wherein the transceiver being a handset transceiver of a first wireless handset;

the second transceiver being a base transceiver of a base unit;

when a communications link is not established between the base transceiver and the handset transceiver, the handset transceiver periodically transmits successive downlink data packets at successively higher power levels until a maximum power level is reached, each successive downlink data packet comprising a power level field for identifying the power level at which each said successive downlink data packet is transmitted.

2. The transceiver of claim 1, further comprising a battery for powering the receiver and transmitter.

3. The transceiver of claim 1, wherein the return power level is set approximately equal to the forward power level.

4. The transceiver of claim 1, wherein the first wireless handset and the base unit are part of a wireless telephone system further comprising a plurality of other wireless handsets, each handset comprising a handset transceiver for establishing a wireless over a shared channel with the base unit via the base transceiver.

5. The transceiver of claim 4, wherein the communication link is a time-division multiple access (TDMA) scheme that allocates time slots to handsets.

6. The transceiver of claim 1, wherein the forward data message comprises a multi-bit field comprising the forward power level information.

7. In a transceiver having a receiver and a transmitter, the transceiver being a handset transceiver of a first wireless handset, and the second transceiver being a base transceiver of a base unit, a method for communicating with a second transceiver, the method comprising the steps of:

receiving and locking onto, with the receiver, a forward data message transmitted by the second transceiver, wherein the forward data message comprises forward power level information identifying a forward power level at which the forward data message was transmitted by the second transceiver and a downlink data packet transmitted by the second transceiver before a communications link is established; and the return data message comprises a return channel link data packet transmitted by the transceiver after the transceiver locks onto the forward signal;

transmitting, with the transmitter, a return data message to the second transceiver at a return power level determined in accordance with the forward power level information; and periodically transmitting, with the handset transceiver, successive downlink data packets at successively higher power levels until a maximum power level is reached, each successive downlink data packet comprising a power level field for identifying the power level at which each said successive downlink data packet is transmitted.

8. The method of claim 7, wherein the forward data message comprises a multi-bit field comprising the forward power level information.

9. A wireless telephone system, comprising:

a base unit having a base transceiver; and a plurality of wireless handsets, each handset comprising a handset transceiver for establishing a wireless link with the base unit, the handset transceiver comprising:

(1) a receiver for receiving and locking onto a forward data message transmitted by the base transceiver, wherein the forward data message comprises forward power level information identifying a forward power level at which the forward data message was transmitted by the base transceiver; and (2) a transmitter for transmitting to the base transceiver a return data message at a return power level determined in accordance with the forward power level information, when a communications link is not established between the base transceiver and a given handset transceiver, the handset transceiver periodically transmits successive downlink data packets at successively higher power levels until a maximum power level is reached, each successive downlink data packet comprising a power level field for identifying the power level at which each said successive downlink data packet is transmitted.

10. The system of claim 9, wherein the return power level is set approximately equal to the forward power level.

11. The system of claim 9, wherein the forward data message comprises a downlink data packet transmitted by the base transceiver before a communications link is established; and the return data message comprises a return channel link data packet transmitted by the transceiver after the transceiver locks onto the forward signal.

\* \* \* \* \*